US009233642B2

United States Patent
Lin et al.

(10) Patent No.: US 9,233,642 B2
(45) Date of Patent: Jan. 12, 2016

(54) VEHICLE COLLISION WARNING APPARATUS AND METHOD

(71) Applicant: INDUSTRIAL TECHNOLOGY RESEARCH INSTITUTE, Hsinchu (TW)

(72) Inventors: Yi-Chun Lin, Hsinchu County (TW); Syuan-Yi Chen, Changhua County (TW); Shih-Yang Lin, Changhua County (TW); Chung-Ming Huang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 39 days.

(21) Appl. No.: 14/265,058

(22) Filed: Apr. 29, 2014

(65) Prior Publication Data

US 2015/0197196 A1 Jul. 16, 2015

(30) Foreign Application Priority Data

Jan. 10, 2014 (TW) .............................. 103101034 A

(51) Int. Cl.
- *B60Q 1/00* (2006.01)
- *B60Q 9/00* (2006.01)
- *G08G 1/16* (2006.01)

(52) U.S. Cl.
CPC ...... *B60Q 9/008* (2013.01); *G08G 1/16* (2013.01); *G08G 1/161* (2013.01)

(58) Field of Classification Search
CPC .................................................... B60Q 9/008
USPC .......................... 340/903, 435, 436; 701/301
See application file for complete search history.

(56) References Cited

U.S. PATENT DOCUMENTS

| | | | |
|---|---|---|---|
| 7,426,437 B2 | 9/2008 | Breed et al. | |
| 7,512,516 B1 | 3/2009 | Widmann | |
| 8,412,416 B2 | 4/2013 | Schwindt et al. | |
| 8,452,055 B2 | 5/2013 | Stein et al. | |
| 8,527,172 B2 | 9/2013 | Moshchuk et al. | |
| 2006/0031015 A1 | 2/2006 | Paradie | |
| 2007/0080825 A1* | 4/2007 | Shiller | 340/903 |

(Continued)

FOREIGN PATENT DOCUMENTS

| CN | 101327796 B | 10/2011 |
|---|---|---|
| CN | 202094809 U | 12/2011 |

(Continued)

OTHER PUBLICATIONS

Office Action Issued by TIPO Dated Dec. 2, 2014.

(Continued)

*Primary Examiner* — Brent Swarthout
(74) *Attorney, Agent, or Firm* — Locke Lord LLP; Tim Tingkang Xia, Esq.

(57) ABSTRACT

Disclosed herein are an apparatus and a method for warning of vehicle collision. The positioning and state-reporting signal of a present vehicle is sensed and that of a target vehicle received. The signals are respectively converted to velocities. The relative velocity of the vehicles and the relative position of the vehicles after a time interval are obtained. The driver of the present vehicle is warned when the normal distance from the present vehicle to the line indicating the direction of the relative velocity is determined to be at a minimum and not greater than a warning distance.

17 Claims, 4 Drawing Sheets

(56) References Cited

U.S. PATENT DOCUMENTS

| | | | |
|---|---|---|---|
| 2011/0307175 A1* | 12/2011 | Gandhi et al. | 701/301 |
| 2013/0293369 A1* | 11/2013 | Reilhac et al. | 340/435 |
| 2014/0032094 A1* | 1/2014 | Heinrichs-Bartscher et al. | 701/301 |

FOREIGN PATENT DOCUMENTS

| | | |
|---|---|---|
| JP | 11003499 | 1/1999 |
| JP | 2004326149 A | 11/2004 |
| JP | 2006188129 A | 7/2006 |
| JP | 2010044461 | 2/2010 |
| TW | I393644 B | 6/2000 |
| TW | I303610 B | 12/2008 |
| TW | I310745 B | 6/2009 |
| TW | I336669 B | 2/2011 |
| TW | I356011 B | 1/2012 |
| TW | I362337 B | 4/2012 |
| WO | 2009049976 A1 | 4/2009 |
| WO | 2010067397 A1 | 6/2010 |

OTHER PUBLICATIONS

Chung-Ming Huang et al., A collision pre-warning algorithm based on V2V communication, IEEE, 2009, Institute for Information Industry, p. 1-6.

Huang Zhu et al., A Communication Protocol for a Vehicle Collision Warning System, IEEE/ACM International Conference on Green Computing and Communications & IEEE/ACM International Conference on Cyber, Physical and Social Computing, 2010, p. 636-644.

Chung-Ming Huang et al., A Cooperative Collision Early-Warning System for vehicles in the curve environment, 2010, IEEE, p. 14-19.

Chung-Ping Young et al., A Highway Traffic Simulator with Dedicated Short Range Communications Based Cooperative Collision Prediction and Warning Mechanism, IEEE Intelligent Vehicles Symposium Eindhoven University of Technology, 2008, p. 114-119, Netherlands.

Japan Patent Office, "Office Action", Aug. 4, 2015, Japan.

Chung-Ming Huang et al., An Advanced Vehicle Collision Warning Algorithm over the DSRC Communication Environment, An Advanced Vehicle Collision Warning algorithm, p. 1-7, Taiwan.

Chung-Ming Huang et al., An Early Collision Warning Algorithm for Vehicles based on V2V Communication, International Journal of Communication Systems, 2011, Taiwan.

Chan Wei Hsu et al., An Inter-Vehicle Geocasting Algorithm for Vehicular Cooperative Collision Warning System using DSRC, Changhua County, Taiwan.

Gongjun Yan et al., Cooperative Collision Warning Through Mobility and Probability Prediction, IEEE Intelligent Vehicles Symposium University of California, 2010, p. 1172-1177, USA.

Chung-Ming Huang et al., Cooperative Vehicle Collision Warning System Using the Vector-Based Approach with Dedicated Short Range Communication Data Transmission, The Institution of Engineering and Technology, 2013, p. 1-11, IET Intelligent Transport Systems.

Alvin Sebastian et al., Multi-vehicles interaction graph model for cooperative collision warning system, IEEE, 2009, p. 929-934, Australia.

Lee, Shin Ching, Using GPS Technique and Cooperative Communication Collision Warning Module, Yu Da University of Science and Technology (YDU), Taiwan.

* cited by examiner

VEHICLE COLLISION WARNING APPARATUS AND METHOD

CROSS-REFERENCE TO RELATED APPLICATIONS

This non-provisional application claims priority under 35 U.S.C. §119(a) on Patent Application No. 103101034 filed in Taiwan, R.O.C. on Jan. 10, 2014, the entire contents of which are hereby incorporated by reference.

TECHNICAL FIELD

The present disclosure relates to collision warning, particularly to an apparatus and a method whereby a vehicle whose operating state is changed warns of collision.

BACKGROUND

Advanced driver assistance systems (ADAS) like the pre-crash system are becoming increasingly marketable as more and more active safety measures are taken in state-of-the-art vehicles. ADAS generally rely on radar, ultrasound, or optical camera to detect the vehicles around and hence offer no guarantee of performance, for the sensing signals are often hindered by obstacles and affected by daylight or the lack thereof.

SUMMARY

The present disclosure provides a vehicle collision warning apparatus comprising a sensing module, a communication module, a computing unit, and a warning component. The sensing module is adapted for sensing a first signal which comprises a first position. The communication module is adapted for receiving a second signal which comprises a second position. The computing unit, coupled to the said modules, is adapted for receiving the first and second signals and converting them respectively to a first velocity and a second velocity to obtain a relative velocity and a relative position, for performing a vector computation to generate a normal distance, a time to closest point of approach (TCPA), and a first result, and for determining, based on the first result, whether to perform a warning computation to generate a second result. The warning component, coupled to the computing unit, is adapted for sending a warning based on the second result.

The present disclosure also provides a vehicle collision warning method in which a sensing module senses a first signal comprising a first position and a communication module receives a second signal comprising a second position. A computing unit converts the first and second positions respectively to a first velocity of a first object and a second velocity of a second object so that a relative velocity of the second object relative to the first object is obtained. The computing unit then obtains a relative position based on the relative velocity. A vector computation is performed by the computing unit to generate a normal distance, a TCPA, and a first result, based on which the computing unit determines whether to perform a warning computation. A warning component sends a warning based on a second result generated by the warning computation.

In the summary above, the normal distance is the perpendicular distance from the first position to the line indicating the direction of the relative velocity, and the TCPA is the time of arrival at the relative position from the second position based on the relative velocity.

BRIEF DESCRIPTION OF THE DRAWING

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
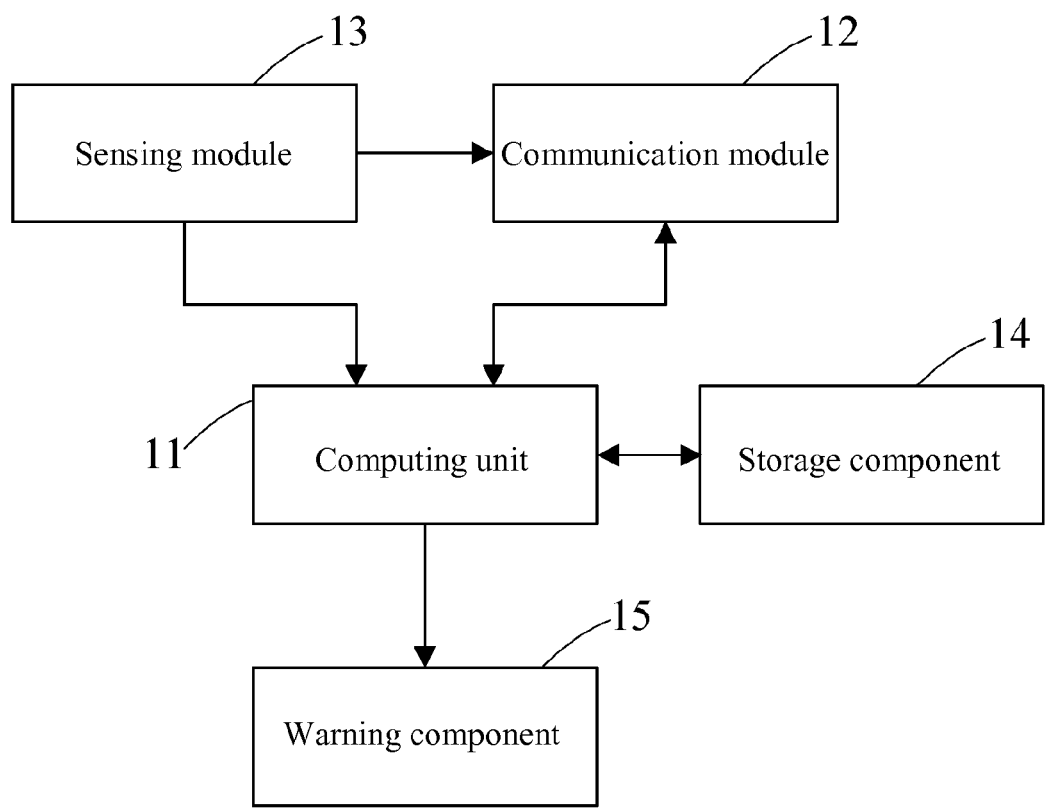
FIG. 1 is a high-level block diagram of a vehicle collision warning apparatus, in accordance with an embodiment of the present disclosure.

FIG. 1 depicts a vehicle collision warning apparatus 10 (hereafter referred to as the apparatus) that may be integrated in an automobile or on a motorcycle or may be a mobile device like a smartphone, tablet, or laptop computer that is placed at the vehicle. The apparatus 10 comprises a computing unit 11, a communication module 12, a sensing module 13, a storage component 14, and a warning component 15. The computing unit 11 is a processor that carries out mathematical computations and makes logical decisions. The communication module 12 is a wireless communication device coupled to the computing unit 11 to receive or send signals. The sensing module 13 is coupled to both the computing unit 11 and the communication module 12 and comprises a satellite navigation (e.g. GPS) receiver to sense the position of the apparatus 10 itself or of the vehicle. The sensing module 13 may further comprise other sensors, such as one for detecting the steering angle. The storage component 14 is coupled to the computing unit 11 as a medium for storing temporary or permanent data. The warning component 15, coupled to the computing unit 11, is at least an audio or video output device like a speaker or a monitor.

For signals to be exchanged between vehicles on the road without fuss, the communication module 12 generally has to comply with a common vehicle-to-vehicle communication standard, such as dedicated short-range communication (DSRC) based on Wireless Access in Vehicular Environments (WAVE). The standard usually specifies the format and frequency band of the signals, and rate at which they are transmitted. A signal picked up by the sensing module 13 contains for example the position, length, width, model, and steering angle of a vehicle. The communication module 12 may receive directly from the sensing module 13 or through the computing unit 11 an aforesaid signal, and send or broadcast it multiple times per second. The communication module 12 receives similar signals broadcast by other vehicles at the same rate and forwards them to the computing unit 11.

The distance between two vehicles travelling toward each other would gradually diminish until the vehicles passed each other, after which instant the distance would start to swell. For the point of view of one of the two vehicles, collision may occur before or at the spot where the vehicles pass each other.

The spot is therefore related to the lengths, widths, velocities, steering angles, etc of both vehicles. Please refer to FIG. 2. As shown in the diagram, a present vehicle is travelling upward at a velocity $\vec{A}$, and a target vehicle is travelling leftward at a velocity $\vec{B}$. The vehicles are turning at angles $\theta_{A1}$ and $\theta_{B1}$ respectively. $\vec{A}$, $\vec{B}$, $\theta_{A1}$, and $\theta_{B1}$ can be converted from the sensed or received signals; for example, the change of position during unit time (usually not more than a second) translates to velocity, and two edges connecting three arbitrary vertices form a steering angle. Steering angles can also be obtained directly from a sensor of the sensing module 13.

Without regard to the lengths and widths of the vehicles, take point A of the present vehicle (usually the center of the vehicle or where the sensing module 13 is) as a reference point relative to which the present vehicle stays stationary and the relative velocity of the target vehicle is $\vec{V}_{BA}=\vec{B}+(-\vec{A})$. After calculating the relative velocity from receiving and sensing the signals of the vehicles, a temporary point or relative position of the target vehicle to the present vehicle at a certain time can be obtained as $TP_1$, the subscript 1 indicating the first round of computation. A vector computation follows and gives the distance from the target vehicle to $TP_1$ as $DR_1$, and the normal or perpendicular distance from the present vehicle to the line indicating the direction of $\vec{V}_{BA}$ (the dashed line) as $DCPA_1$. The said line intersects with $DCPA_1$ at the first closest point of approach (CPA), $CPA_1$. As evident from the description above and the triangle of A, $CPA_1$, and B, the distance $DR_1$ is shorter than $DAB_1$, the distance from point A of the present vehicle to point B of the target vehicle, suggesting that $DCPA_1$ is not at a minimum. In other words, the two vehicles have yet to reach where they may pass or collide with each other, and the computing unit 11 carries on with the second round of computation and beyond, until the minimum distance $DCPA_n$ is found during the n-th round.

The relative position $TP_n$ and the distance thence to point B of the target vehicle, $DR_n$, are obtained in the n-th round. The passing or collision would occur before or at $TP_n$ if $DR_n$ was equal to or only just larger than the distance $DAB_n$ between the vehicles. $DCPA_n$ then is the minimum distance from point A to any CPA, in particular $CPA_n$, and the time it takes for the target vehicle to arrive at $CPA_n$ from point B is $TCPA_n$, the n-th time to closest point of approach (TCPA). In the current embodiment, the computing unit 11 is concerned with whether $DR_n$ is not less than $DAB_n$. In another embodiment that produces the same result, it is determined instead whether the sum $DR_1+DR_2+\ldots+DR_n$ is not less than $DAB_1$. Given the time-varying nature of the positions, velocities, and distances mentioned above, they may be temporarily stored in the storage component 14, especially $DCPA_n$. In practice, the said computation is performed by a present vehicle for a plurality of target vehicles; that is, distances and times to various CPAs at different points in time are obtained to facilitate warning determination.

Figure 2:
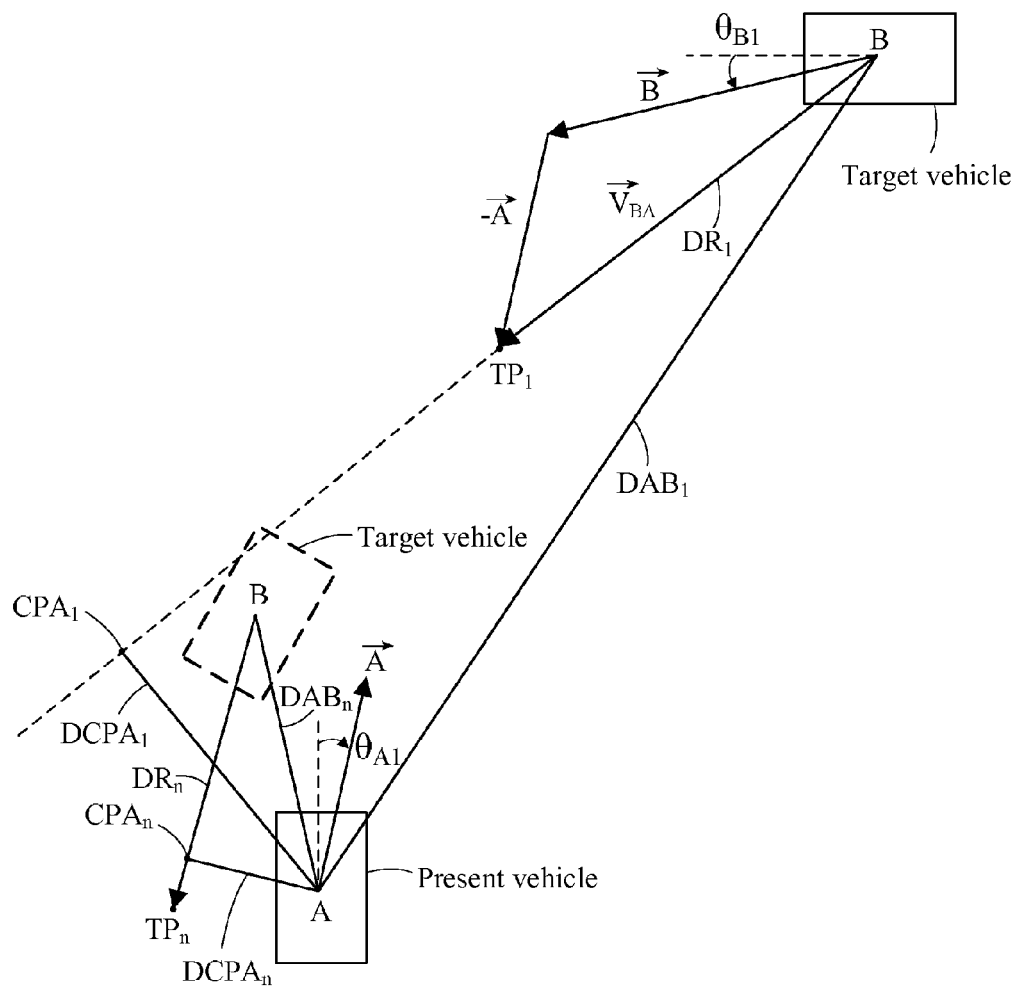
FIG. 2 illustrates a vector computation, in accordance with an embodiment of the present disclosure.
Figure 3:
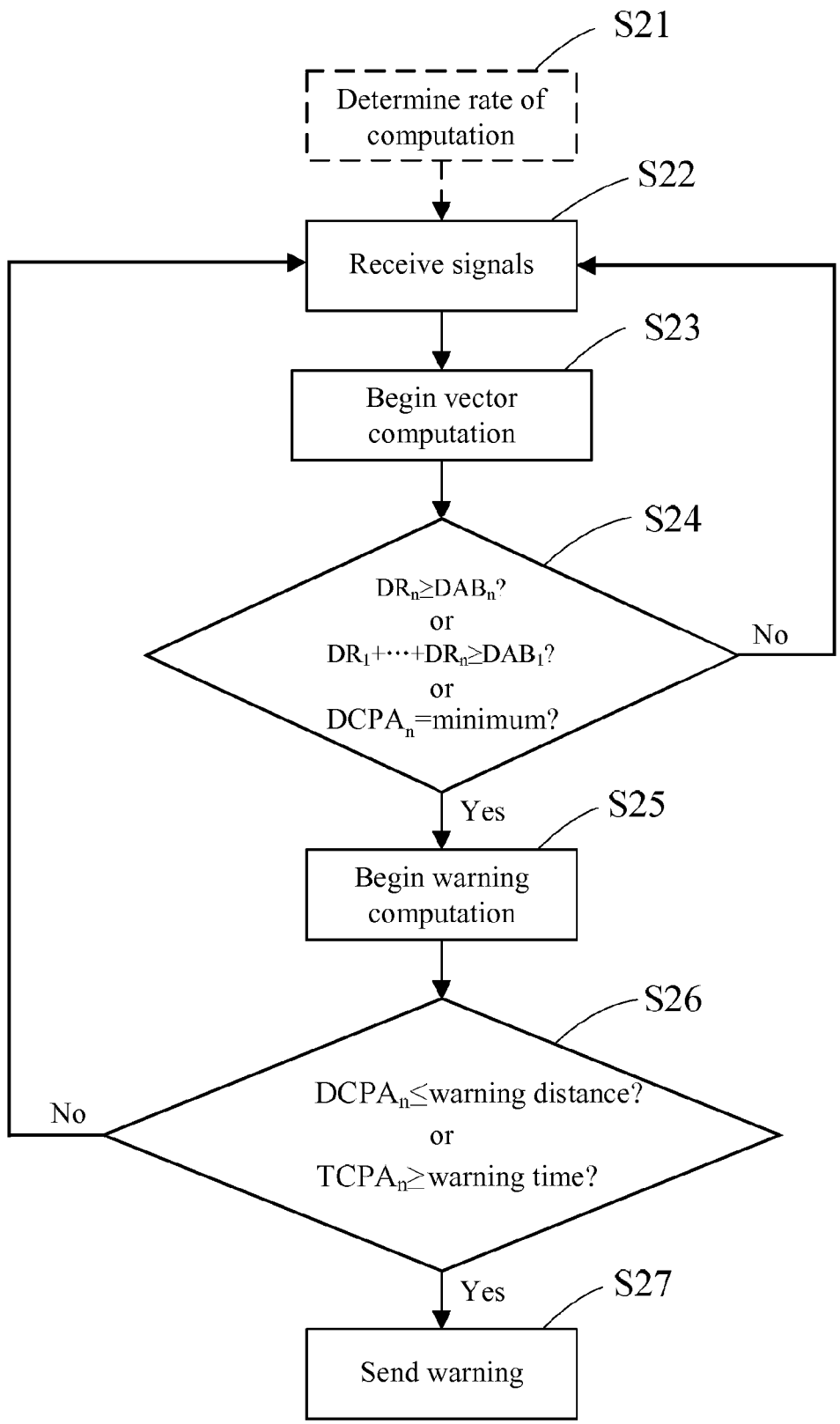
FIG. 3 is a flowchart of a vehicle collision warning method, in accordance with an embodiment of the present disclosure.

To predict the exact spot of collision and determine a warning distance or time, the real lengths and widths of the vehicles must be taken into consideration, in addition to computing CPAs and distances and times thereto as described in FIG. 2. Please refer to FIG. 3. As shown in the flowchart, the rate at which the rounds of computation are performed is first determined in step S21. Please recall that signals are sent or broadcast multiple times a second per specification of a vehicle-to-vehicle communication standard. In addition to sending the sensed signal of a present vehicle, the communication module 12 receives signals from nearby target vehicles. Such a signal identifies at least the position of a target vehicle. Depending on its own capability, the computing unit 11 may not retrieve every transmission of the signal for computation, but instead adapts its workload in step S21 to, say, the distance between the present and target vehicles, or the steering angle of the present vehicle. For instance, the rate of computation may be increased when the distance shortens or when the steering angle becomes larger, and decreased vice versa. Step S21 is shown in dashed lines because it need not be executed every round of computation.

A round of computation starts with step S22. The rate of computation determined, the computing unit 11 of the apparatus 10 installed on the present vehicle receives a first signal sensed by the sensing module 13 and at least one second signal received by the communication module 12. The nomenclature here of "first" and "second" is for purposes of illustration only. The first signal comprises a first location of the apparatus 10, and the second signal comprises a second location of an identical or compatible apparatus installed on the target vehicle. The locations are typically expressed in longitude and latitude, such as "N242051.2 E1204853.1." The first and second signals may further comprise the lengths, widths, and steering angles of their respective source vehicles.

As the first location representing where the apparatus 10 is and the second location representing where the other apparatus is are received, the computing unit 11 converts in step S23 the two locations respectively to a first velocity and a second velocity, whereby a relative velocity and a relative position (or temporary point) after a certain time of the present and target vehicles are obtained. The computing unit 11 then begins a vector computation to obtain the distance $DR_n$ from the second position to the relative position, the distance $DAB_n$ from the second position to the first position, and the normal distance $DCPA_n$ from the first position to the line indicating the direction of the relative velocity.

Once the distances $DR_n$, $DAB_n$, and $DCPA_n$ are obtained, the computing unit 11 determines in step S24 whether $DR_n$ is not less than $DAB_n$, whether the sum $DR_1+DR_2+\ldots+DR_n$ is not less than $DAB_1$, or whether $DCPA_n$ is at a minimum. When one of the three conditions holds, the closest point of approach, $CPA_n$, and the time ($TCPA_n$) and the minimum normal distance ($DCPA_n$) thereto are decided. According to the result of step S24, the method of the present disclosure proceeds to step S25 or returns to step S22 to start a fresh round of computation.

Figure 4:
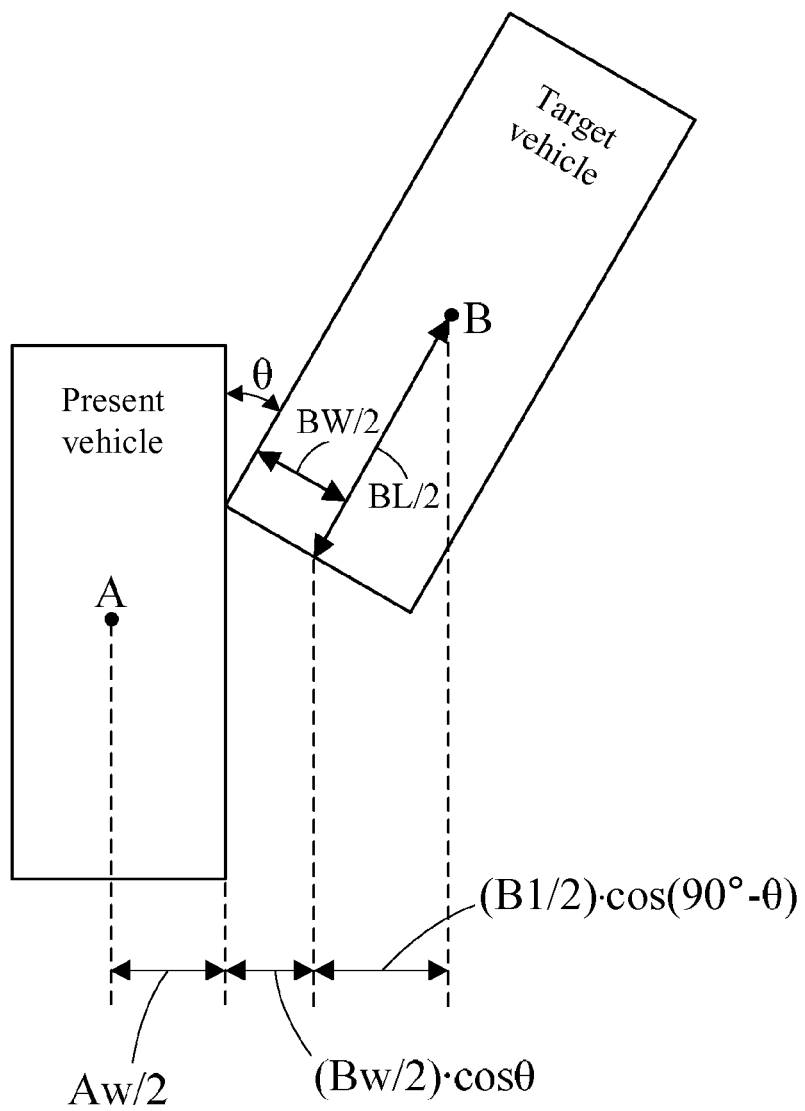
FIG. 4 illustrates the calculation of a warning distance, in accordance with an embodiment of the present disclosure.

After ascertaining $CPA_n$, $TCPA_n$, and $DCPA_n$ in steps S23 and S24, the computing unit 11 derives a warning distance and a warning time in step 25 based on the vehicular lengths, widths, and steering angles included in the first and second signals. The warning distance may be based on how the target vehicle would actually collide with the present vehicle, e.g. from the left or from the right. FIG. 4 depicts a collision on the right-hand side of the present vehicle, wherein the warning distance should not be less than $Aw/2+(Bw/2)\cos\theta+(B1/2)\cos(90°-\theta)$, Aw being the width of the present vehicle, Bw and B1 respectively the width and length of the target vehicle, and $\theta$ the relative steering angle of the target vehicle to the present vehicle at the moment of collision. $\theta$ may be derived from the instantaneous positions and velocities of the vehicles, or obtained directly from the sensing module 13. Analogous to the nomenclature in FIG. 2, $\theta$ is the sum of $\theta_{An}$ and $\theta_{Bn}$ for the vehicles are turning toward opposite directions, or otherwise a difference of the steering angles. The warning time should not be greater than $TCPA_n$ and may be adjusted to vehicular performance or the gender, age, or mental state of the driver.

The warning distance and time established, the warning computation continues in step S26, where the computing unit 11 determines whether the minimum normal distance $DCPA_n$ is not greater than the warning distance. The computing unit 11 issues a command to the warning component 15 when it is determined that $DCPA_n$ is less than or equal to the warning distance and collision is to occur before or at $CPA_n$, or when $TCPA_n$ is not less than the warning time; otherwise the method of the present disclosure returns to step S22.

Upon the conclusion of step S26 and based on the command from the computing unit 11, the warning component 15 sends a warning to the driver of the present vehicle in step S27. The warning may comprise a voice prompt, such as "collision to occur within six meters to the right" or "collision to occur on the left in three seconds," or it may comprise a light prompt, for example flashing warning lights. The warning would be sent by the apparatus 10 should it be a mobile device. The warning may be sent incessantly until the emergency is neutralized; that is, the decision in step S26 or S24 no longer stands as the position or steering angle of the present or target vehicle is changed. In that case, the method of the present disclosure returns to step S21 or S22 to start a fresh round of computation.

Instead of employing radar, ultrasound, or optical camera like an existing ADAS to detect the vehicles around, the present disclosure complies with a common vehicle-to-vehicle communication standard, e.g. one that works in the 5.9-GHz frequency band, with low latency (0.2 ms), long range (1000 m), and high transmission rate (27 Mbps), and adaptively receives and sends the locations of identical or compatible collision warning apparatus (or of the vehicles where they are installed). Through vector and warning computations, a minimum distance and a time to CPA are obtained and compared respectively to a warning distance and a warning time, generating a result indicating potential collision and a need to send out warning. The present disclosure provides omnidirectional detection and enhanced accuracy of warning, while avoiding the shortcomings of existing products.

What is claimed is:

1. A vehicle collision warning apparatus comprising:
    a sensing module, sensing a first signal, the first signal comprising a first position;
    a communication module, receiving a second signal, the second signal comprising a second position;
    a computing unit, coupled to the sensing module and the communication module, receiving the first signal and the second signal, converting the first signal and the second signal respectively to a first velocity and a second velocity to obtain a relative velocity and a relative position, performing a vector computation to generate a normal distance, a time to closest point of approach (TCPA), and a first result, and determining, based on the first result, whether to perform a warning computation to generate a second result; and
    a warning component, coupled to the computing unit to send a warning based on the second result;
    wherein the normal distance is the perpendicular distance from the first position to the line indicating the direction of the relative velocity, and the TCPA is the time of arrival at the relative position from the second position based on the relative velocity; and
    wherein the warning computation comprises determining, based on the first result, whether the normal distance is not greater than a warning distance, and generating the second result when the normal distance is not greater than the warning distance, and the warning distance is determined by a length, a width, and a steering angle of at least one vehicle.

2. The vehicle collision warning apparatus of claim 1, wherein the communication module is further coupled to the sensing module and adapted for sending the first signal.

3. The vehicle collision warning apparatus of claim 1, wherein the vector computation comprises determining whether a first distance from the second position to the relative position is not less than a second distance from the second position to the first position, and generating the first result when the first distance is not less than the second distance.

4. The vehicle collision warning apparatus of claim 1, wherein the vector computation comprises determining whether the normal distance is at a minimum, and generating the first result when the normal distance is at the minimum.

5. The vehicle collision warning apparatus of claim 1, wherein the warning computation comprises determining, based on the first result, whether the TCPA is not greater than a warning time, and generating the second result when the TCPA is not greater than the warning time.

6. The vehicle collision warning apparatus of claim 1, further comprising:
    a storage component, coupled to the computing unit to record at least the normal distance.

7. The vehicle collision warning apparatus of claim 1, wherein the first velocity is of a first object, the second velocity is of a second object, and the relative velocity is of the second object relative to the first object.

8. The vehicle collision warning apparatus of claim 1, wherein the relative position is of a first object and a second object based on the relative velocity after an interval, the interval being the time the computing unit needs to complete the vector computation.

9. The vehicle collision warning apparatus of claim 1, wherein the warning comprises a voice prompt or a light prompt.

10. The vehicle collision warning apparatus of claim 1, wherein the first signal or the second signal further comprises a length, a width, and a steering angle of at least one vehicle.

11. A vehicle collision warning method comprising:
    sensing, by a sensing module, a first signal, the first signal comprising a first position;
    receiving, by a communication module, a second signal, the second signal comprising a second position;
    converting, by a computing unit, the first position and the second position respectively to a first velocity of a first object and a second velocity of a second object, in order to obtain a relative velocity of the second object relative to the first object;
    obtaining, by the computing unit, a relative position based on the relative velocity;
    performing, by the computing unit, a vector computation to generate a normal distance, a time to closest point of approach (TCPA), and a first result;
    determining, by the computing unit based on the first result, whether to perform a warning computation to generate a second result; and
    sending, by a warning component, a warning based on the second result;
    wherein the normal distance is the perpendicular distance from the first position to the line indicating the direction of the relative velocity, and the TCPA is the time of arrival at the relative position from the second position based on the relative velocity; and wherein the warning computation comprises:
    determining, based on the first result, whether the normal distance is not greater than a warning distance, wherein the warning distance is determined by a length, a width, and a steering angle of at least one vehicle; and
    generating the second result when the normal distance is not greater than the warning distance.

12. The vehicle collision warning method of claim 11, wherein the vector computation comprises:
    determining whether a first distance from the second position to the relative position is not less than a second distance from the second position to the first position; and
    generating the first result when the first distance is not less than the second distance.

13. The vehicle collision warning method of claim 11, wherein the vector computation comprises:
    determining whether the normal distance is at a minimum; and
    generating the first result when the normal distance is at the minimum.

14. The vehicle collision warning method of claim 11, wherein the warning computation comprises:
    determining, based on the first result, whether the TCPA is not greater than a warning time; and
    generating the second result when the TCPA is not greater than the warning time.

15. The vehicle collision warning method of claim 11, wherein the relative position is of a first object and a second object based on the relative velocity after an interval, the interval being the time the computing unit needs to complete the vector computation.

16. The vehicle collision warning method of claim 11, wherein the warning comprises a voice prompt or a light prompt.

17. The vehicle collision warning method of claim 11, wherein the first signal or the second signal further comprises a length, a width, and a steering angle of at least one vehicle.

* * * * *